United States Patent

Andrews, deceased

[11] 3,938,928
[45] Feb. 17, 1976

[54] MULTIPLE MOLD ROTARY CASTING APPARATUS

[76] Inventor: Alvadore M. Andrews, deceased, late of Portland, Oreg., by The United States National Bank of Oregon, executor

[22] Filed: Jan. 24, 1974

[21] Appl. No.: 436,191

[52] U.S. Cl. .............................. 425/430; 425/435
[51] Int. Cl.² ........................................ B29C 5/04
[58] Field of Search .......... 425/429, 218, 430, 460, 425/434, 426, 435; 164/115, 117, 164/116, 118, 119

[56] References Cited
UNITED STATES PATENTS

| | | | |
|---|---|---|---|
| 3,095,260 | 6/1963 | Ferriot | 425/430 |
| 3,112,529 | 12/1963 | Chupa | 425/430 |
| 3,233,287 | 2/1966 | Blue et al. | 425/434 |
| 3,350,745 | 11/1967 | Schott et al. | 425/429 |
| 3,796,533 | 3/1974 | Vox | 425/429 |
| 3,810,727 | 5/1974 | Pivar | 425/430 |
| 3,892,272 | 7/1974 | Carillon et al. | 425/435 |

FOREIGN PATENTS OR APPLICATIONS

| | | | |
|---|---|---|---|
| 623,674 | 5/1949 | United Kingdom | 62/64 |

*Primary Examiner*—Ronald J. Shore
*Assistant Examiner*—R. J. Charvat
*Attorney, Agent, or Firm*—Klarquist, Sparkman, Campbell, Leigh, Hall & Whinston

[57] ABSTRACT

A rotary casting apparatus for molding hollow articles of synthetic plastic is described employing a plurality of hollow molds which are heated and rotated within a fixed oven. The molds and molded articles therein are cooled rapidly while they remain within the oven by injecting cool, moist air into such oven from an external blower fan and a sprayer which sprays water into the air inlet of such fan. Improved rotation and support means are provided for the molds, including a common tubular drive shaft which rotates all of the molds about a common axis and a plurality of rotor means for rotating each of the molds about another axis perpendicular to such common axis. The rotor means are coupled by bevel gears to a second drive shaft extending through the common drive shaft. Each of the molds is rotationally mounted on bearings which are supported on the common drive shaft. The bearings at the inner ends of the molds each include a tubular fixed shaft about which the mold is rotated by the rotor means and which also vents gas from such mold. A scraper ring of low adhesion material is attached to the fixed bearing shaft within each mold and spaced a predetermined distance from its inner surface to provide the molded article with a mounting flange portion of predetermined thickness and inner diameter.

14 Claims, 6 Drawing Figures

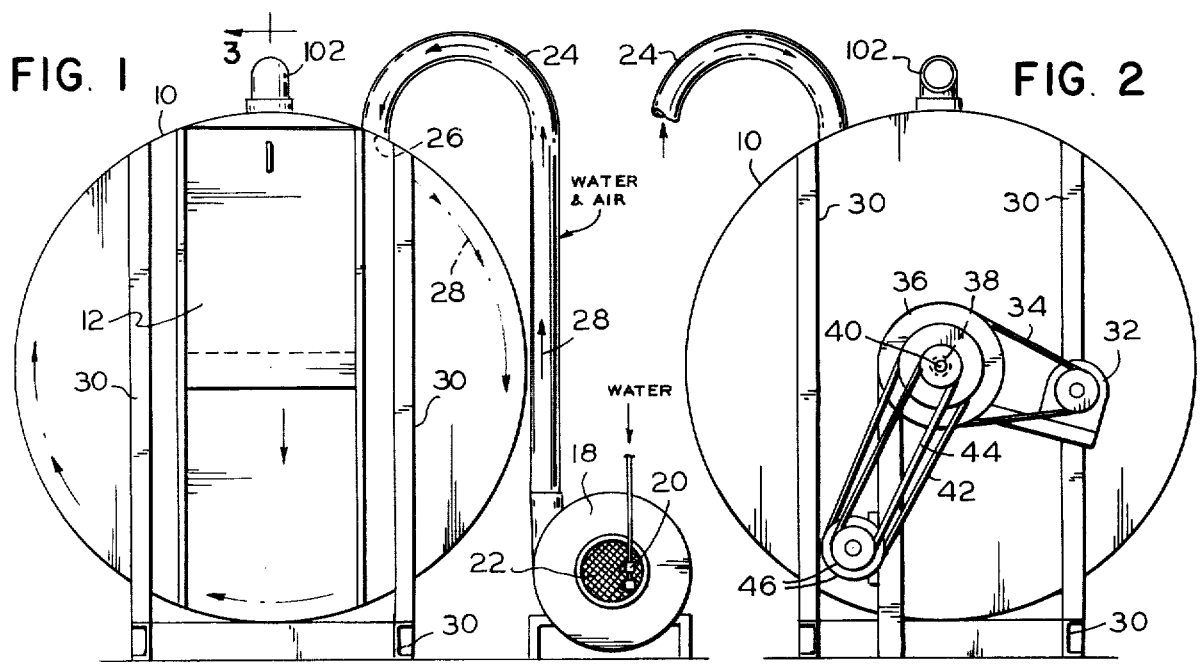
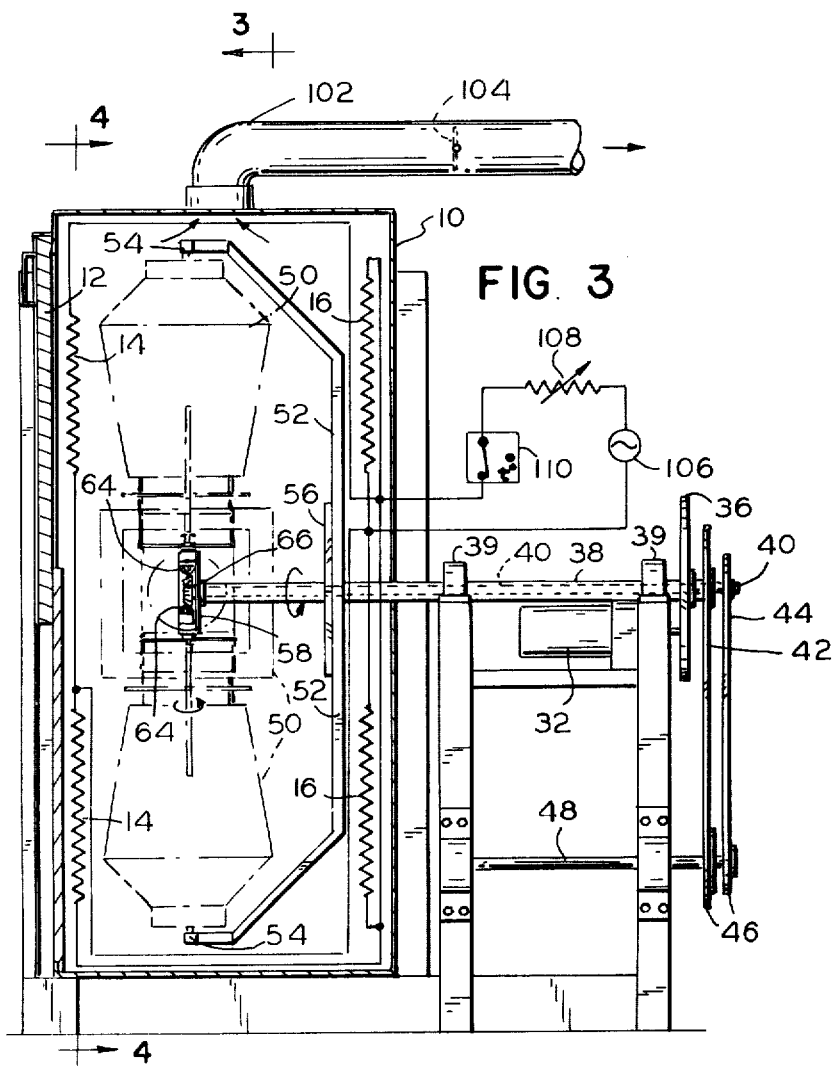

MULTIPLE MOLD ROTARY CASTING APPARATUS

BACKGROUND OF THE INVENTION

The subject matter of the present invention relates generally to rotary casting apparatus for molding hollow articles of synthetic plastic material in a plurality of hollow molds which are each rotated and heated within a fixed oven. In particular, the invention relates to such a rotary casting apparatus having an improved rotation and support means for rotating each of the molds about two perpendicular axes, as well as an improved cooling means for cooling the molds within the oven by injecting cool, moist air into such oven.

While the present rotary casting apparatus can be employed to manufacture other hollow plastic articles, it is especially useful in molding globes for lamp posts and is an improvement on the prior molding apparatus shown in U.S. Pat. No. 3,570,061, granted Mar. 16, 1971, to A. M. Andrews. This prior apparatus was used for molding single articles one at a time in an oven, but it is not suitable for molding a plurality of articles simultaneously because, among other reasons, such oven is rotated to rotate the mold about its second axis. In addition, it has been found that spraying water directly onto the molds by a sprayer nozzle positioned within the oven, as in this prior apparatus, can, under some circumstances, cause bubbles to occur in the molded article apparently due to excess moisture entering the molds. Both of these problems are overcome in the present invention by the improved rotation and support means for the molds which enables the oven to remain stationary and by the improved cooking means which directs moist air into the oven from an external source.

In previous multiple mold rotational casting apparatus employing a stationary oven, the molds are cooled in a separate cooling chamber outside of the oven by spraying water thereon, as shown in U.S. Pat. No. 3,561,060 of Stevens. This results in a much more complicated and expensive apparatus and does not avoid the bubbling problem discussed above. Recently it has been proposed in U.S. Pat. No. 3,574,245 by R. G. Dohm to provide a rotational casting apparatus employing a plurality of molds which are heated and cooled by transmitting heating liquid and cooling liquid to jackets surrounding the molds without using an oven. However, this type of heating and cooling greatly complicates the rotation and support means for the molds because the heating and cooling fluids must pass through rotating shafts forming part of such rotation and support means. The present invention provides an improved multiple mold rotary casting apparatus which is much simpler, more compact and less expensive than these prior apparatus and which produces molded articles of improved quality.

SUMMARY OF THE INVENTION

It is, therefore, one object of the present invention to provide an improved rotary casting apparatus of simple, compact and economical construction capable of molding articles of high quality.

Another object of the invention is to provide such a casting apparatus in which a plurality of molds are rotated within a stationary oven by improved rotation and support means.

A further object of the present invention is to provide such a casting apparatus with an improved external cooling means for cooling the molds within the oven in a quick, efficient manner by injecting cool, moist air into such oven from an external source.

An additional object of the invention is to provide such an improved casting apparatus in which the molds are rotated about fixed bearing shafts which are connected to scraper rings of low adhesive material provided within the molds to form the molded article with a mounting base portion of predetermined thickness and inner diameter.

Still another object of the invention is to provide such a rotary casting apparatus in which the rotation and support means for the molds includes a common drive shaft which rotates all of the molds about a common axis and which supports all of such molds, as well as a plurality of rotor means for rotating the molds about different axes perpendicular to such common axis.

A still further object of the present invention is to provide such a casting apparatus in which the common drive shaft is tubular and a second drive shaft extends within it and is coupled by bevel gears to a plurality of rotor shafts in the rotor means supported on one end of the common drive shaft in order to provide a simple, compact rotation and support means for the molds.

BRIEF DESCRIPTION OF DRAWINGS

Other objects and advantages of the present invention will be apparent from the following detailed description of a preferred embodiment thereof and from the attached drawings of which:

FIG. 1 is a front elevation view of a multiple mold rotary casting apparatus in accordance with a preferred embodiment of the present invention;

FIG. 2 is a rear elevation view of the rotary casting apparatus of FIG. 1.

FIG. 3 is an enlarged vertical section view taken along the line 3—3 of FIG. 1 and schematically showing the heating elements and electrical circuitry associated therewith;

DESCRIPTION OF PREFERRED EMBODIMENT

Figure 4:
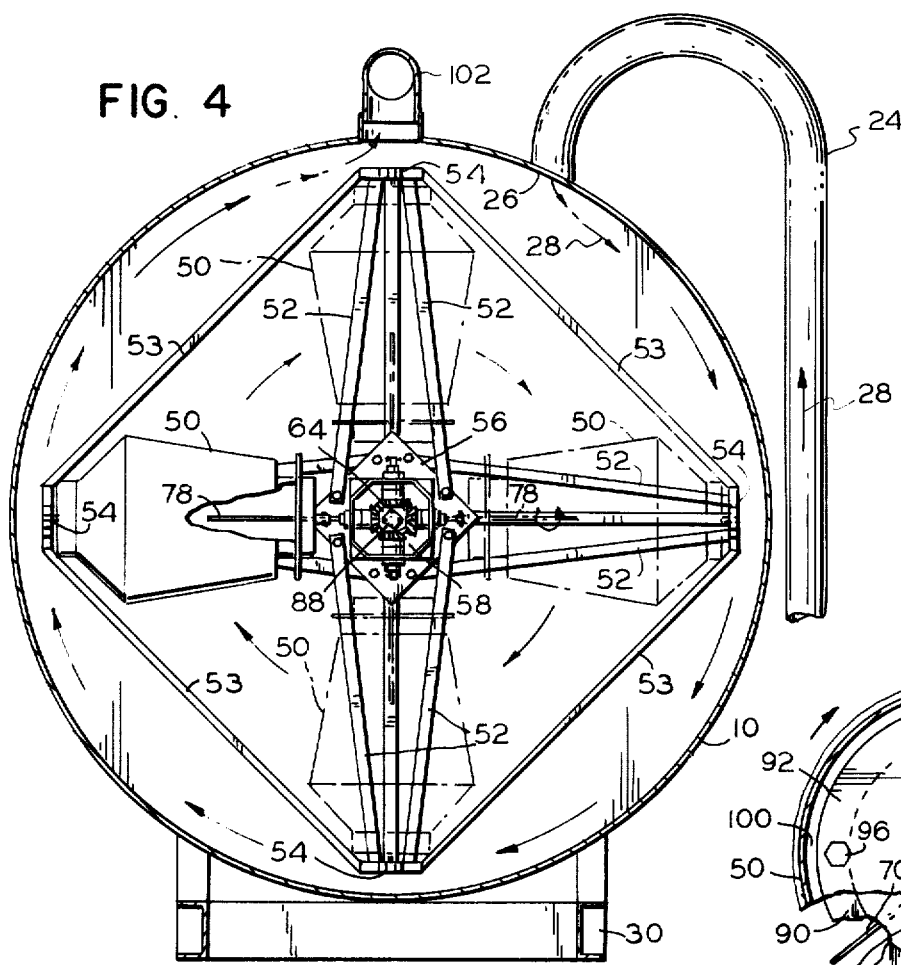
FIG. 4 is a vertical section view taken along the line 4—4 of FIG. 3 showing one of the molds in place which is partially broken away for purposes of clarity.

As shown in FIGS. 1 and 2, the rotary casting apparatus of the present invention includes a fixed oven 10 in the form of a cylindrical drum having a sliding door 12 mounted on its front end which slides up and down for insertion and removal of the molds. The oven is heated by electrical resistance heating elements 14 and 16, respectively, provided in the front and rear portions of the oven, as shown schematically in FIG. 3. The molds and the articles molded therein are cooled within the oven 10 by an external cooling means including a source of cool, moist air provided outside the oven by a blower fan 18 and a pair of water spray nozzles 20 positioned to spray water into the air inlet opening 22 of such fan. The air outlet of the fan is connected by a tubular conduit 24 to an inlet opening 26 in the top of the oven for injecting in such oven the cool, moist air stream transmitted from the fan through such conduit, as shown by arrows 28.

The oven 10 is fixedly supported in a stationary position on a support frame 30. An electric motor 32 is attached to the support frame at the rear of the oven and its output shaft is connected by coupling belts 34 to a first pulley 36 which is keyed to a tubular drive shaft 38 for rotating such shaft within bearings 39. This tubular shaft 38 is a common drive shaft for rotating all of the molds about the horizontal axis of such shaft. In addition, a second drive shaft 40 is provided within the tubular common drive shaft 38 and connected through other belts 42 and 44 and two pulleys 46 on an idler shaft 48 to the common drive shaft which also drives the second shaft. Thus, while the tubular outer common drive shaft 38 may rotate at a relatively slow speed of about 5 rpm the inner second drive shaft 40 may rotate at a much faster speed several times that of the outer shaft.

Figure 5:
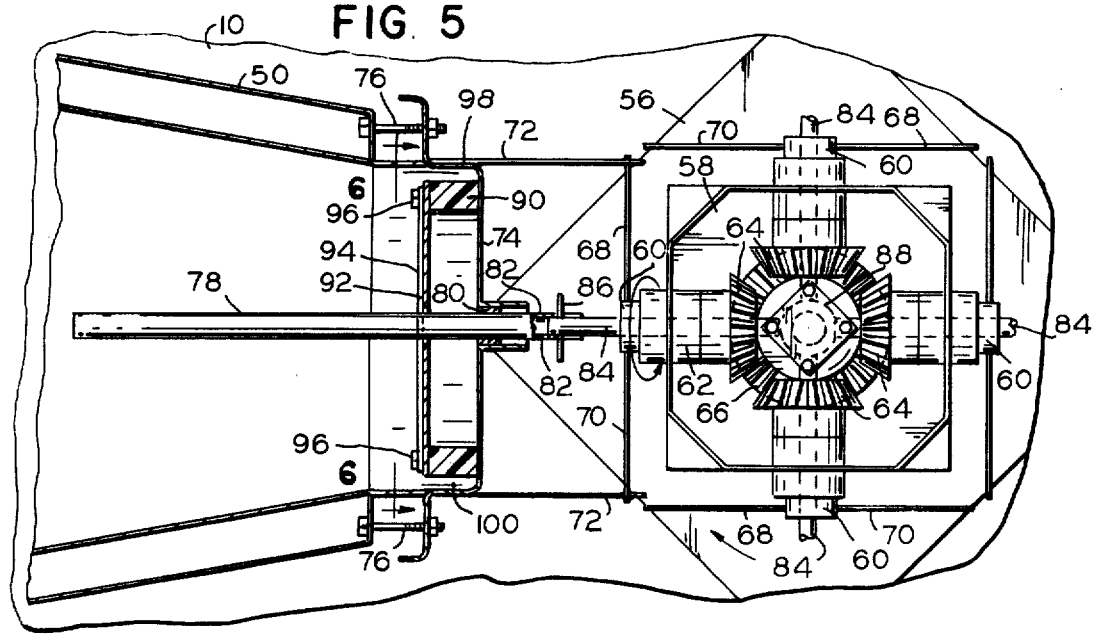
FIG. 5 is an enlarged view of a portion of the mold and associated rotation and support means of FIG. 4.

As shown in FIGS. 3 and 4, a plurality of hollow molds 50 of a suitable metal are supported for clockwise rotation about a common horizontal axis within the oven 10 on the tubular drive shaft 38 by support arms 52 which are connected together by reinforcing struts 53. The support arms are attached between a first bearing means 54 at the outer end of each of the molds and a common support plate 56 attached to an intermediate position of the outer drive shaft 38. A cup-shaped support member 58 is attached to the end of the tubular drive shaft 38 for supporting a plurality of rotor means each including a rotor shaft 60, employed to rotate the molds about different axes which are all perpendicular to the common horizontal axis. The rotor shafts 60 are each mounted within a bearing sleeve 62 attached to one side of the support member 58, as shown in FIG. 5. A bevel gear 64 is provided on the inner end of the rotor shaft 60 of each of the rotor means and meshes with a common bevel gear 66 attached to the end of the second drive shaft 40. Thus, each of the rotor shafts 60 is rotated by the bevel gears 64, 66 coupling such rotor shaft to the second drive shaft 40. A pair of rods 68 and 70 are attached to each rotor shaft 60 so that such rods extend laterally from the rotor shaft at right angles thereto a sufficient distance to engage projections 92 extending from the inner ends of the molds 50 for rotation of such molds, as shown in FIGS. 5 and 6.

The four molds 50 are each provided with a removable cover 74 closing their inner end which is attached to the body of the mold by bolts 76 and associated nuts. Such molds are rotatably mounted on stationary bearing shafts 78 extending through a bushing 80 provided at the center of each mold cover. The bearing shaft 78 may be a hollow tube which opens into the mold cavity and is provided with vent holes 82 in the side of such tube outside of the mold in order to vent the gasses produced within the mold when melting the synthetic plastic molding material therein to form the molded article. Each bearing shaft 78 is keyed to a fixed bearing rod 84 by a removable pin 86 passing through one end of such rod. The other ends of the bearing rods 84 are connected together by bolting them to a common connector plate 88 in order to prevent rotation of such rods relative to the second drive shaft 40. However, it should be noted that the "fixed" bearing rods 84 pass through the rotor shafts 60 and move with such rotor shafts when their support plate 58 rotates with the common outer drive shaft 38.

Figure 6:
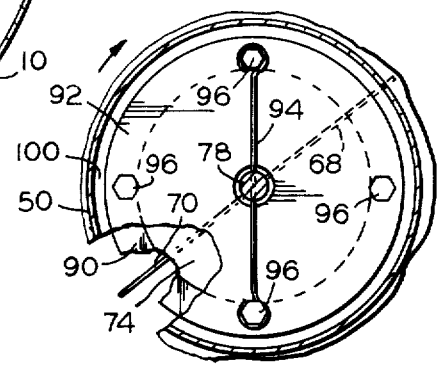
FIG. 6 is a vertical section view taken along the line 6—6 of FIG. 5.

As shown in FIGS. 5 and 6, each of the molds 50 is provided with a scraper ring 90 of low adhesion material such as polytetrafluoroethylene plastic, known as "Teflon," which is mounted on a metal disc 92. The support disc 92 is secured to the fixed bearing shaft 78 by a wire 94 passing through an aperture in such shaft and having its opposite ends fixed to a pair of bolts 96 attaching the scraper ring to the support disc. The scraper ring 90 is spaced inwardly from a side portion 98 of the mold cover 74 so that the space 100 therebetween forms the mounting base portion of the globe or other article being molded to provide such base with a predetermined wall thickness and a predetermined inner diameter so that it will fit tightly on a lamp post or other tubular support. It should be noted that the scraper ring 90 is fixed to bearing shaft 78 against rotation about the axis of the rotor shaft 60 while the mold 50 rotates about such axis, thereby causing the scraper to smooth the inner surface of the base portion of the molded article. In addition, the inner end of the scraper ring 90 rubs against the inner surface of the mold cover 74 and prevents the plastic molding material from running beneath the support disc 92.

While any suitable synthetic plastic molding material may be employed, it has been found that a butyrate, sold by Eastman Plastics under the trade name "Tenite" is preferable for lamp post globes since it retains its light transparency and does not change color appreciably with ultraviolet radiation in prolonged exposure to sunlight. When such butyrate is employed as the plastic material, it has been found advantageous to make the molding surfaces of the mold 50 of cold rolled steel which seems to aid in preventing the formation of bubbles in the molded article, as does the previously described cooling technique which reduces the amount of moisture that enters the molds. In this regard, it should be noted that the inlet opening 26 of the oven for the cool, moist air is positioned above the fan 18 and the water sprayer nozzles 20 so that there is little likelihood of any water droplets being directed onto the mold and reaching the interior of the mold to cause the formation of bubbles in the molded article.

When the cool, moist or humid air strikes the heated molds 50, a large amount of steam is generated which is conveyed away from the oven 10 through an exhaust conduit 102 connected to an outlet opening in the top of such oven. This exhaust conduit 102 may be provided with a gate valve 104, as shown in FIG. 3. In addition, the gas fumes generated within the molds and vented into the oven 10 through vent tubes 78 when the plastic molded material is melted, are also exhausted through conduit 102.

The heating of the electrical heating elements 14 and 16 is accomplished in a conventional manner by connecting them to a suitable source 106 of electrical power, such as a 220 volt, 60 cycle A.C. power line, through a variable resistor 108 and a thermostat control 110, shown as a bimetallic switch. The thermostat switch 110 is set for the maximum temperature of the oven which is above the melting temperature of the synthetic plastic molding material and below the melting temperature of the mold members, including the scraper ring 90. The amount of current flowing through the heating elements may be varied by adjusting the variable resistor 108 to provide the proper amount of heat emitted by such elements. Of course, other suitable heating means can be employed, and that schematically shown in FIG. 3 is merely illustrative.

It will be obvious to those having ordinary skill in the art that many changes may be made in the details of the above-described preferred embodiment of the invention without departing from the spirit of such invention. Therefore, the scope of the present invention should only be determined by the following claims.

I claim:

1. A rotational casting apparatus comprising:
   mold means including a plurality of hollow molds for molding synthetic plastic material into hollow articles by rotation of said molds when they contain said plastic;
   an oven enclosing said molds and having heating means for heating said molds, said oven being fixed in position;
   cooling means separate from said heating means, for cooling said molds and the molded articles therein while they are in said oven by transmitting moist air cooling fluid from an external source into the oven in the space surrounding outside of the molds; and
   rotation means for rotating said molds within said oven, including a common drive shaft for rotating all of the molds about a common axis, a plurality of rotor means for rotating each of said molds about its mold axis at an angle to said common axis, and support means for supporting each of said molds on said common drive shaft so their mold axes extend radially and are circumferentially spaced about said common axis.

2. Apparatus in accordance with claim 1 in which the support means include rotational bearing means for supporting the molds at their opposite ends and drive means different from the common drive shaft for rotating the molds on said bearing means.

3. Apparatus in accordance with claim 2 in which the drive means includes a plurality of rotor shafts for rotating the molds and which are coupled to a second drive shaft by bevel gears, said second drive shaft extending coaxial within the common drive shaft.

4. Apparatus in accordance with claim 1 in which the rotor means for each mold includes a driven rotor shaft and a rotor rod which is attached to the rotor shaft to extend laterally therefrom so that the rotor rod engages at least one projection on the mold for rotation of said mold on a fixed bearing shaft.

5. Apparatus in accordance with claim 4 in which the fixed bearing shaft includes a vent tube portion which extends into the mold for venting.

6. Apparatus in accordance with claim 4 in which the fixed bearing shafts of all of the rotor means are connected together.

7. Apparatus in accordance with claim 1 in which support means each include a first bearing means for supporting the outer end of the mold associated therewith and a second bearing means for supporting the inner end of said mold.

8. Apparatus in accordance with claim 7 in which the first bearing means of the molds are supported on a plurality of support arms attached in radially spaced relationship to an intermediate portion of the common drive shaft, while the second bearing means of said molds are supported on a common support plate attached to one end of said common drive shaft.

9. A rotational casting apparatus comprising:
   mold means including at least one hollow mold for molding synthetic plastic material into hollow articles by rotation of said molds when they contain said plastic;
   an oven including heating means for heating said mold above the melting temperature of said plastic, said oven being fixed in position;
   rotational mounting means for mounting said mold for rotation within said oven; and
   cooling means separate from said heating means for cooling said mold and the molded article therein while they are in said oven to a temperature below said melting temperature, said cooling means including a fan for providing an air stream, external water spray means for spraying water into the air inlet of said fan outside said oven to provide a stream of cool, moist air external to the oven and input means for transmitting said stream of moist air into said oven to cool said mold.

10. Apparatus in accordance with claim 9 in which the input means includes a conduit connected from the air outlet of said fan to an inlet opening in said oven at a point above said fan and water spray means.

11. Apparatus in accordance with claim 9 in which the mold means includes a plurality of molds which are all rotated about a common axis and each of which also rotates about another axis at an angle to said common axis.

12. Apparatus in accordance with claim 11 wherein the molding surfaces of the molds are made of cold rolled steel.

13. Apparatus in accordance with claim 1 in which the cooling means includes air supply means for providing an air stream, external water spray means for spraying water into the air of said air stream outside said oven to provide a stream of cool, moist air external to the oven and input means for transmitting said stream of moist air into said oven to cool said mold.

14. A rotational casting apparatus comprising:
   mold means including a plurality of hollow molds for molding synthetic plastic material into hollow articles by rotation of said molds when they contain said plastic;
   heating means including an oven enclosing said molds for heating said molds, said oven being fixed in position;
   cooling means for cooling said molds and the molded articles therein while they are in said oven;
   rotation means for rotating said molds within said oven, including a common drive shaft for rotating all of the molds about a common axis, a plurality of rotor means for rotating each of said molds about a fixed bearing shaft extending at an angle to said common axis, and support means for supporting each of said molds on said common drive shaft; and
   scraper rings of low adhesion material attached to the bearing shafts within such molds so that the scraper rings are each spaced a predetermined distance from the inner surface of a side portion of one end of the mold to provide the molded article with a portion of predetermined thickness and inner diameter.

* * * * *